Dec. 4, 1956  S. LEASURE  2,772,725
DRIVER-REST PAD
Filed Feb. 1, 1955
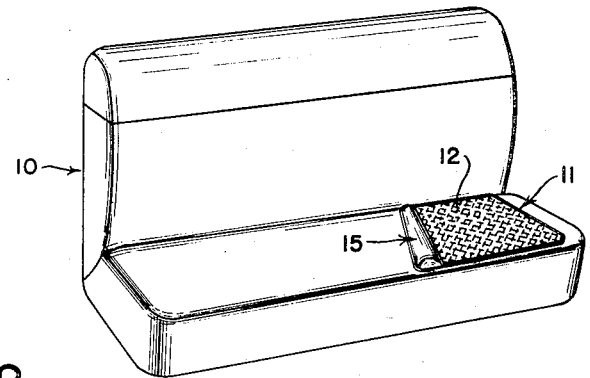
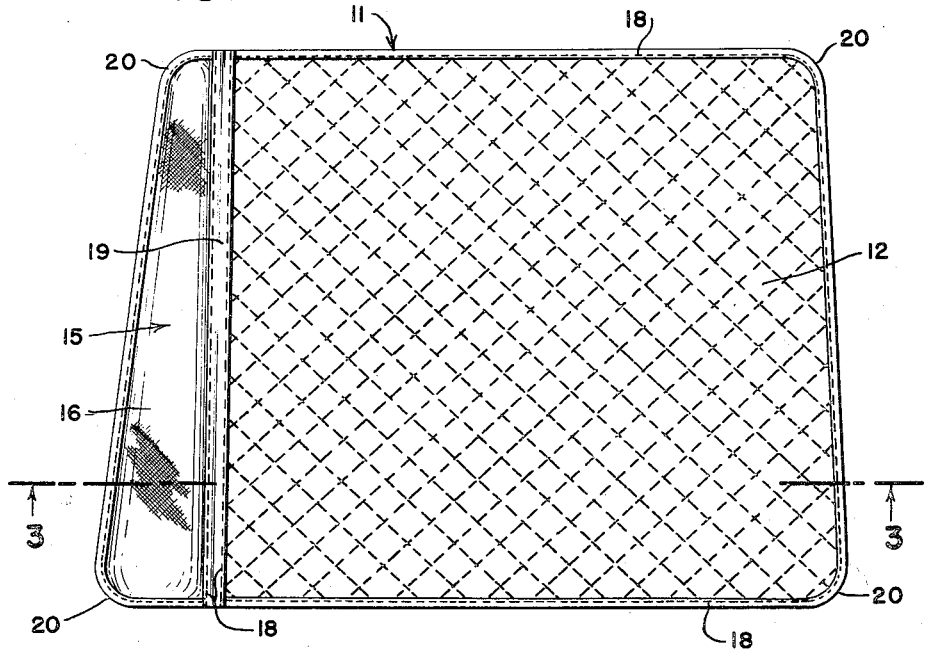
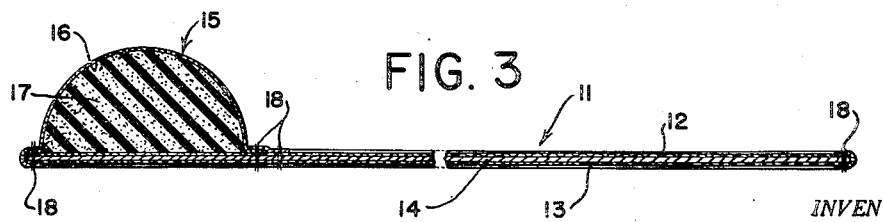
INVENTOR.
Stanley Leasure
BY
Burton Perlman
ATTORNEY.

United States Patent Office 2,772,725
Patented Dec. 4, 1956

2,772,725
DRIVER-REST PAD

Stanley Leasure, Antofagasta, Chile

Application February 1, 1955, Serial No. 485,501

1 Claim. (Cl. 155—182)

This invention relates to a device for easing fatigue while driving an automobile or truck, and more particularly to a pad of unique configuration for the relief of strain on the muscles of the right leg and thigh, which pad operates effectively without the necessity for the operator interrupting operation of his vehicle.

Anyone who has operated a motor vehicle, whether it be an automobile or a truck, though the situation is aggravated in the case of driving a truck, is familiar with the fact that after a period of operation fatigue attacks the right leg and thigh of the operator. While in driving, the left leg may be freely shifted about to seek a more comfortable position, no such freedom of movement is available with the right leg. This is true because with cars having a clutch pedal any operation to be performed by a left foot is a periodic one only. Indeed with contemporary automatic transmissions there is no function so far as operation of the vehicle is concerned which the left foot and leg is called upon to play. With the right leg, on the other hand, while one drives his vehicle it is necessary that the right foot play a continuing part, a part which often requires a more or less constant exertion without intermission where the vehicle is in continuous motion for appreciable periods of time. It is the nature of this exertion that a constant, though perhaps slightly varying pressure be maintained on the accelerator pedal, and that this pressure be more or less constant. The net effect of this exertion is to maintain the muscles of the right leg under a constant tension.

It is the primary object of this invention to provide a structure which is capable of offering to the operator of a vehicle, which calls for the sort of exertion alluded to by the operator thereof, a support which passively supplies relief to aching tense muscles of the right leg and thigh. The nature of the structure by which such relief is to be furnished is that of a pad whose right extremity is comprised of a resilient roll against, or alternatively, upon which the operator may rest or press his thigh, thus altering the pattern of stresses which are imposed upon the leg muscles. Such shift, it has been found, furnishes relief of the nature described. Moreover, to most effectively furnish such relief, I have found that the roll should be tapered from the front to rear of the pad.

It is a further object to supply relief of the sort described by means of a structure which does not require permanent installation in an automobile but may be readily removed when its presence is undesirable. This object is implemented by so fashioning the pad whereby this invention is executed, that the operator sits upon a portion of the structure, and by his weight holds in place the remedial roll.

A further object herein is to provide a structure capable of furnishing the relief sought, which may be inexpensively fabricated, and consequently furnished conveniently to a large market. While I contemplate that generally a single size pad will suffice for all drivers, I wish to state specifically that it is within the ambit of my invention that such pad be supplied for varying sizes suitable for drivers of different dimension.

How these and many other objects are to be implemented will become clear through a consideration of the accompanying drawings wherein:

Fig. 1 shows the inventive structure in position on an automobile seat as it would be located for use, Fig. 2 shows a top plan view of the inventive structure, and Fig. 3 is a section taken at 3—3 of Fig. 2.

As may best be appreciated from Fig. 3, the pad 11 consists of two portions, the roll or support portion and the seat portion which comprises the balance of the pad or that portion to the right of the roll as seen in the accompanying drawings. The pad 11 is constructed in the seat portion with an upper cover 12, which may be decoratively stitched, a bottom cover 13 of canvas or other durable material, and between upper cover 12 and bottom cover 13, a stiffener member 14 of less flexibility than either of covers 12 or 13. It will be seen that in the embodiment shown in Fig. 3, covers 12 and 13, and stiffener 14 extend all the way from side to side of the pad 11.

At the left side of the pad as seen in the accompanying drawings (which would be to the right of a driver) is situated the roll portion 15. It will be noted that this roll tapers from front to back of the pad. In structure, the roll is formed by creating a pocket 16 of fabric or other suitable material, which pocket contains the foam rubber roll 17. While I prefer to use foam rubber in my structure, it is possible to use other resilient materials in its stead, and such substitution would not remove such a structure from the ambit of my invention.

Stitching 18 is employed to hold the components of my invention in their proper relative dispositions. In addition, a reinforcing strip 19 is laid down at the juncture between the material forming pocket 16 and the upper cover 12, in recognition of the fact that this is an area of great stress in the pad. The corners 20 of the pad are rounded.

It will be seen that the pad is entirely removable from the automobile. When used, the pad is held in place entirely by the weight of the driver sitting on the seat portion thereof. The roll or support portion is then held in contiguity to the right thigh of the driver. The driver may press his thigh against the roll, rest his thigh upon the roll, or because the roll is tapered, and an angular disposition of the roll relative to the leg may be provided, varying pressures at different portions of the thigh may be provided for. Thus, the nature of the pad provides great flexibility for the easing of fatigue with drivers of varying physical build.

While I have described a specific embodiment of my invention it is apparent that changes and modifications may be made therein without departing from the spirit of my invention.

I claim:

A pad for use on the driver's seat of an automobile whereby the fatigue of the operator may be relieved comprising a seat portion having a bottom covering sheet, a top covering sheet and a sheet of stiffener material situated between said top and bottom covering sheets, and a support portion at the right extremity of said pad and extending from front to back of said pad, said support portion comprising a roll of foam rubber substantially semicircular in cross section, the radius of said roll diminishing from front to back of said pad.

References Cited in the file of this patent

UNITED STATES PATENTS

| 2,081,111 | Manley | May 18, 1937 |
| 2,167,178 | Kohlstadt | July 25, 1939 |
| 2,614,273 | Yancofski | Oct. 21, 1952 |

FOREIGN PATENTS

| 346,911 | Great Britain | Apr. 23, 1931 |